(12) United States Patent
Jang et al.

(10) Patent No.: US 11,947,956 B2
(45) Date of Patent: Apr. 2, 2024

(54) SOFTWARE INTELLIGENCE AS-A-SERVICE

(71) Applicant: International Business Machines Corporation, Armonk, NY (US)

(72) Inventors: Jiyong Jang, Chappaqua, NY (US); Dhilung Kirat, Hartsdale, NY (US); Marc Philippe Stoecklin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 16/811,126

(22) Filed: Mar. 6, 2020

(65) Prior Publication Data

US 2021/0279303 A1    Sep. 9, 2021

(51) Int. Cl.
*G06F 8/74* (2018.01)
*G06F 8/41* (2018.01)
*G06F 21/12* (2013.01)
*G06F 21/57* (2013.01)
*G06N 5/022* (2023.01)

(52) U.S. Cl.
CPC ............... *G06F 8/74* (2013.01); *G06F 8/447* (2013.01); *G06F 21/125* (2013.01); *G06F 21/577* (2013.01); *G06N 5/022* (2013.01)

(58) Field of Classification Search
None
See application file for complete search history.

(56) References Cited

U.S. PATENT DOCUMENTS

| | | | |
|---|---|---|---|
| 2007/0226696 A1* | 9/2007 | Radhakrishnan | G06F 8/456 717/127 |
| 2008/0154965 A1* | 6/2008 | Pedersen | G06F 8/36 |
| 2010/0274755 A1* | 10/2010 | Stewart | G06F 8/75 706/54 |
| 2013/0254751 A1* | 9/2013 | Howard | G06F 8/20 717/136 |
| 2014/0082584 A1* | 3/2014 | Kim | G06F 11/3668 717/124 |
| 2016/0182558 A1* | 6/2016 | Tripp | G06F 21/562 726/25 |
| 2018/0048661 A1 | 2/2018 | Bird et al. | |
| 2018/0159876 A1* | 6/2018 | Park | H04L 63/1425 |
| 2019/0294733 A1* | 9/2019 | Scheideler | G06F 16/9024 |
| 2019/0312869 A1 | 10/2019 | Han et al. | |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Qing Chen
(74) *Attorney, Agent, or Firm* — Jordan T. Schiller

(57) ABSTRACT

A method, system and apparatus for software intelligence as-a-service, including decomposing software into functional blocks to provide a software genome, building a representation of the software genome in a knowledge graph linking granularities of the functional blocks, and identifying issues with a target software based on the knowledge graph.

16 Claims, 14 Drawing Sheets

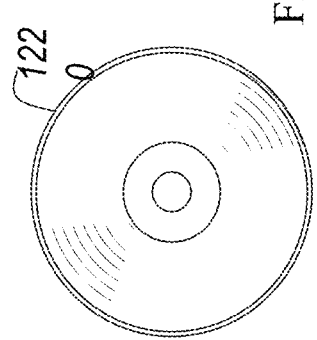
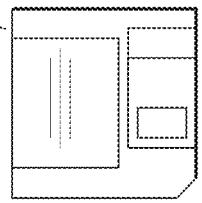
FIG. 11

SOFTWARE INTELLIGENCE AS-A-SERVICE

BACKGROUND OF THE INVENTION

Field of the Invention

The disclosed invention relates generally to an embodiment of a method, apparatus, and system for providing software intelligence, and more particularly, but not by way of limitation, relates to a method, apparatus, and system for providing software intelligence as-a-service to an organization.

Description of the Background Art

The networks have been growing in size and complexity in exponential proportion over recent years. Therefore, providing risk management of the software has been even more difficult. Organizations seeking to protect their intellectual property, protect identities, avoid disruptions, and the like, need to do more than just check for malware.

Software Intelligence is insight into complex software structure produced by software designed to analyze database structure, software framework and source code to better understand and control complex software systems in Information Technology environments. Software Intelligence is produced by a set of software tools and techniques for the mining of data and software inner structure. End results are information used by business and software stakeholders to make informed decisions, communicate about software health, measure efficiency of software development organizations, and prevent software catastrophes.

Currently there are services focused merely on malware detection and Indicators of Compromise (IoCs) for evidence that a cyber-attack has taken place. Other present services merely build process monitoring, file system scanning and code snippet matching. Another service merely identifies vulnerabilities and sensitive data leakage and code source analysis. Yet, another service provides merely scans for vulnerabilities in the image's installed packages.

Therefore, there is need to provide software intelligence beyond merely detecting malware.

SUMMARY OF INVENTION

In view of the foregoing and other problems, disadvantages, and drawbacks of the aforementioned background art, an exemplary aspect of the disclosed invention provides a method, apparatus, and system for providing software intelligence as-a-service to an organization.

One aspect of the present invention is to provide a method for providing software intelligence, the method including decomposing software into functional blocks to provide a software genome, building a representation of the software genome in a knowledge graph linking granularities of the functional building blocks, and identifying issues with a target software based on the knowledge graph.

Another aspect of the present invention provides system for source code software intelligence, including a computer, including a memory storing computer instructions, and a processor configured to execute the computer instructions to decompose software into functional blocks to provide a software genome, build a representation of the software genome in a knowledge graph linking granularities of the functional building blocks, and identify issues with a target software based on the knowledge graph.

Another example aspect of the disclosed invention is to provide computer program product comprising a computer readable storage medium having program instructions embodied therewith, the program instructions readable and executable by a computer to cause the computer to perform a method, including decomposing software into functional blocks to provide a software genome, building a representation of the software genome in a knowledge graph linking granularities of the functional building blocks, and identifying issues with a target software based on the knowledge graph.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

FIG. 11 illustrates a signal-bearing storage medium for storing machine-readable instructions of a program that implements the method according to the example embodiment of the present invention.

DETAILED DESCRIPTION OF PREFERRED EMBODIMENTS

Figure 1:
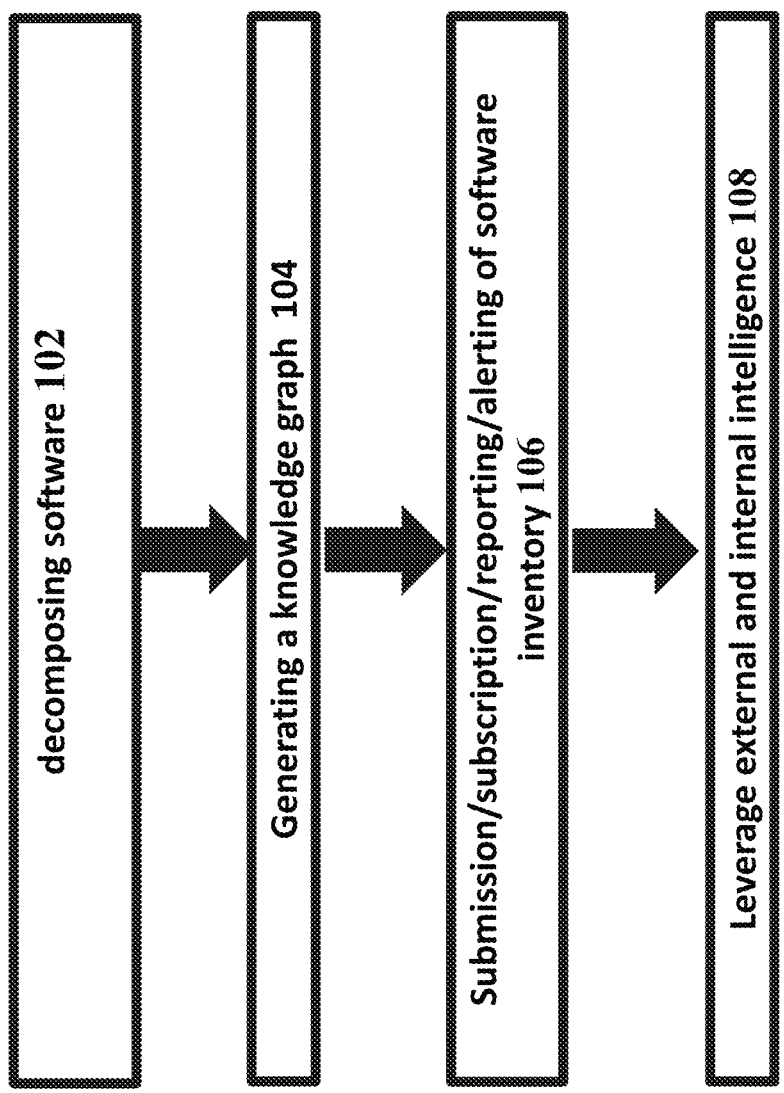
FIG. 1 illustrates a method of software intelligence as-a-service in an example embodiment of the present invention.

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims. Moreover, please note that any of the steps can be performed in different sequences or combined or at the same time. In addition, any of structures shown can be modified or combined.

Currently there is no service for software intelligence as-a-service with a large flexibility to assess a variety of risks relating to software.

Software as a service (SaaS) is a software distribution model in which a third-party provider hosts applications and makes them available to customers over the Internet. SaaS is one of three main categories of cloud computing, alongside infrastructure as a service (IaaS) and platform as a service (PaaS).

Therefore, there is a need for advanced software techniques to provide software intelligence as-a-service.

One of the features of the present invention is to use software intelligence on a different level than currently used. As mentioned previously, current software intelligence has the limitation of detecting malware.

According to the present invention, from the use case-wise perspective, software intelligence as-a-service is used for different people, organizations, or entities to detect risks related to software including, but not limited to software bugs, vulnerabilities, plagiarism, malicious code, etc. Approach-wise, a system can perform an X-ray like method where it can decompose software into finer granularity such as function-level components, compute corresponding software genes that capture the semantic essence of the components, and build a knowledge graph that captures the relationships among software genes.

There is a software genome knowledge graph were multiple genes or nodes are interconnected along with various other knowledge graph entities such as software-version, file-reputation, etc. For example, where entities such as law enforcement or a developer downloads a new software, the system calls the new downloaded software to a knowledge graph and while getting the software as queried program or target program, the system decomposes it into functions, and then into multiple genes and compare to knowledge graph and finding development or relationships from knowledge graph. If it happens that a gene is close to in knowledge graph or close to bug in knowledge graph, this may be known bug etc. Then the system can inform people or the entities about software intelligence like the bug that is discovered, plagiarism, or other risks.

The X-ray method can be used to obtain the genome. The method can decompose software into different levels of granularities and then extract gene from that granularity. One of the main granularities the present method uses is at the "function" level. However, the disclosure is not limited to the "function" level granularity. For example, software genes can be computed at "basic block" level or "section" level or "file" level. The system may also combine genes from different levels to improve the quality of software intelligence.

One of the many features of the invention is extraction of the gene (i.e., part of software component or function) from software component (e.g., function level compiled code objects) and then form the knowledge graph from the gene (e.g., part of the function level compiled code objects). Then, the knowledge graph is used for different use cases for different types of users.

All software programs are constructed from fundamental elements 1) basic blocks of instructions and 2) control flow logics. A software genome computes genes to capture the semantic essence of such fundamental elements of the software, and then build a massive graph database of all observed software (both benign and malicious software), which allows the system to reason over software specimens coming from heterogenous sources to produce "software intelligence".

The present invention is described in further detail below.

FIG. 1 illustrates a method of software intelligence as a service in an example embodiment of the present invention.

First, the system 100 uses a method such as software X-ray method decomposing software into its gene of the functional building blocks ("software genome") in step 102.

The concept of the "gene" is similar to "fingerprint" or "signature". However, the "gene" approach tries to capture the software content's richness (semantic essence) in its entirety looking at various aspects, while a fingerprint/signature may only consider the header part of the content. The system 100 can decompose software into different levels of granularities and then extract "gene" from that granularity. One of the granularities generated by the system 100 is at the "function" level (e.g., via disassembly/decompilation process). However, the software genome approach should not be limited to that, e.g., genes can be computed at "basic block" level or "section" level or "file" level. It may even be combined and used along with "function-level" to improve the quality of software intelligence. The system 100 can decompose by, for example, disassembly of the software into the function level granularity.

X-ray is an analysis that operates on the function/method level of the source code or compiled binary where corresponding source code may not be available. Since software is usually distributed without source code, it is noteworthy that the present method can be applied directly to software binary (compiled code objects) without source code and not only to software with source code. Thus, X-ray method can provide deep and detailed information on what occurs or happens inside the source code or software binary, including implementation "dialect", control flow logics, loop patterns, usage of unique constants etc. By inspecting multiple versions of the same software the X-ray method can also identify hotspots. Hotspots are code with high change frequencies. The X-ray method lets one make sense of large files and get specific recommendations on the parts to improve. X-ray provides detailed information on why a cluster of files are temporally coupled. X-ray recommends re-structuring opportunities on the methods in hotspots in order to make the code easier to understand and maintain.

Other methods can also be used to decompose the software to its fingerprint of functional building blocks. In computer science, fingerprinting algorithm is a procedure that maps an arbitrarily large data item (such as a computer file) to a much shorter bit string, its fingerprint, that uniquely identifies the original data for all practical purposes just as human fingerprints uniquely identify people for practical purposes. This fingerprint may be used for data deduplication purposes. This is also referred to as file fingerprinting, data fingerprinting, or structured data fingerprinting. Fingerprints are typically used to avoid the comparison and transmission of bulky data. For instance, a web browser or proxy server can efficiently check whether a remote file has been modified, by fetching only its fingerprint and comparing it with that of the previously fetched copy.

Fingerprint functions may be seen, for example, as high-performance hash functions used to uniquely identify substantial blocks of data where cryptographic hash functions may be unnecessary.

Then, the system 100 performs representation of the decomposing (or breakdown into component elements) in a knowledge graph ("software genome KG (knowledge graph)") linking granularities (i.e., parts of the component elements, such as the parts of the functional components of the software) in step 104. The system 100 is then able to monitor software at multiple granularities (ranging from binaries, scripts, libraries applications to container images, IoT devices). Therefore, the granularities of the software can be, for example, binaries, scripts, libraries applications to container images, references to IoT devices, etc., extracted from the software.

Then, the system 100 can provide submission/subscription/reporting/alerting of software inventory of interest by organizations in step 106. Different functions or services which can be provided to a particular client based on the software genome knowledge graph (KG). In the embodiments, not all different functions or services are needed to be provided and that only a subset can be provided to a given client. The services, can be for example, software X-ray report, software inventory risk alerting, KG analytics, etc. There can also be, for example, services like multiple facets of monetization for the organization or user, e.g., software X-ray report [e.g., free service], software inventory risk alerting [e.g., paid service], KG analytics [paid service], etc. Therefore, different levels of the identification can be performed at different payment schemes or payment levels which affords flexibility.

The system 100 can leverage or use external (e.g., AV (Anti-Virus engines), CVEs (Common Vulnerabilities and Exposures), sandbox reports, dark web) and internal (e.g., analytics, mining) threat intelligence to further refine the risks assessed in step 106 to output a more refined deduced risks in step 108. The dark web, for example, refers to encrypted online content that is not indexed by conventional search engines. CVEs (Common Vulnerabilities and Exposures) is a list of entries, each containing an identification number, a description, and at least one public reference for publicly known cybersecurity vulnerabilities. Sandbox reports include dynamic execution behavior of software and Anti-Virus engines directly provide reputation scores for software binary. The system 100 can decompose an unknown software sample into hundreds of functions and corresponding genes. If some of those genes are same or similar to genes that are predominantly found only in malicious software, the system 100 produces a valuable bit of software intelligence that the unknown software sample could be malicious. To assert "genes that are predominantly found only in malicious software", the system 100 may need to leverage or use external/internal intelligence sources. Therefore, when the Knowledge Graph is supplemented by threat intelligence sources, this adds more nodes to the KG that are not "gene" type nodes but other types of nodes such as "file-reputation" type nodes coming from external sources.

Figure 2:
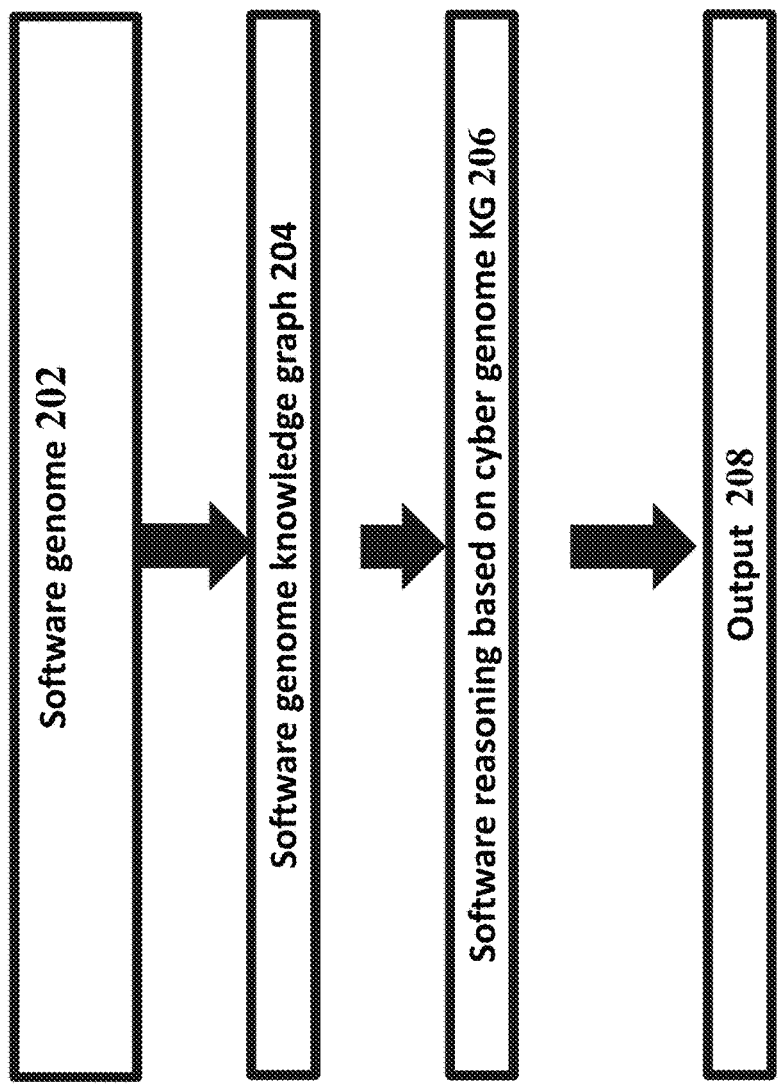
FIG. 2 illustrates a method of software intelligence as-a-service in another example embodiment of the present invention.

Therefore, the supplemental information, for example, from the dark web can be used to further refine the risk that was assessed in step 106. Therefore, the output from step 106 can be further refined based on the additional information to provide the leveraged output of the risks in step 108. The supplemented Knowledge Graph is re-analyzed for risks in step 108 and reported similar to in step 106. FIG. 2 illustrates a method of software intelligence as a service in another example embodiment of the present invention.

The system 100 establishes a security knowledge graph (KG) with a specific focus on software security intelligence. First, there is the use of software genome or software genomics (step 202). There is a design code fingerprinting for identification. There is also evaluation of represented methods (e.g., deep learning) for static software analysis. The genome or functional blocks are generated for the software as also seen in FIG. 1.

The system 100 generates a software genome knowledge graph in step 204 from the generation of the software genome, which includes broader threat intelligence sources for comprehensive software analysis, inspection of software/containers for security risks, and provenance analysis.

The system 100 then provides software reasoning based on the software genome KG in step 206. The reasoning can include, for example, track device/container/software vulnerabilities, detect variants of malware, identify code plagiarism, and other identification of issues with the source code. A target software can be analyzed for identification of intelligence issues based on a comparison with the knowledge graph in step 206. The comparing can occur via machine learning or similarity-matching algorithms, or other methods. The software reasoning or determination of intelligence of the target software is then outputted in step 208 to a user, entity or organization, etc.

Figure 3:
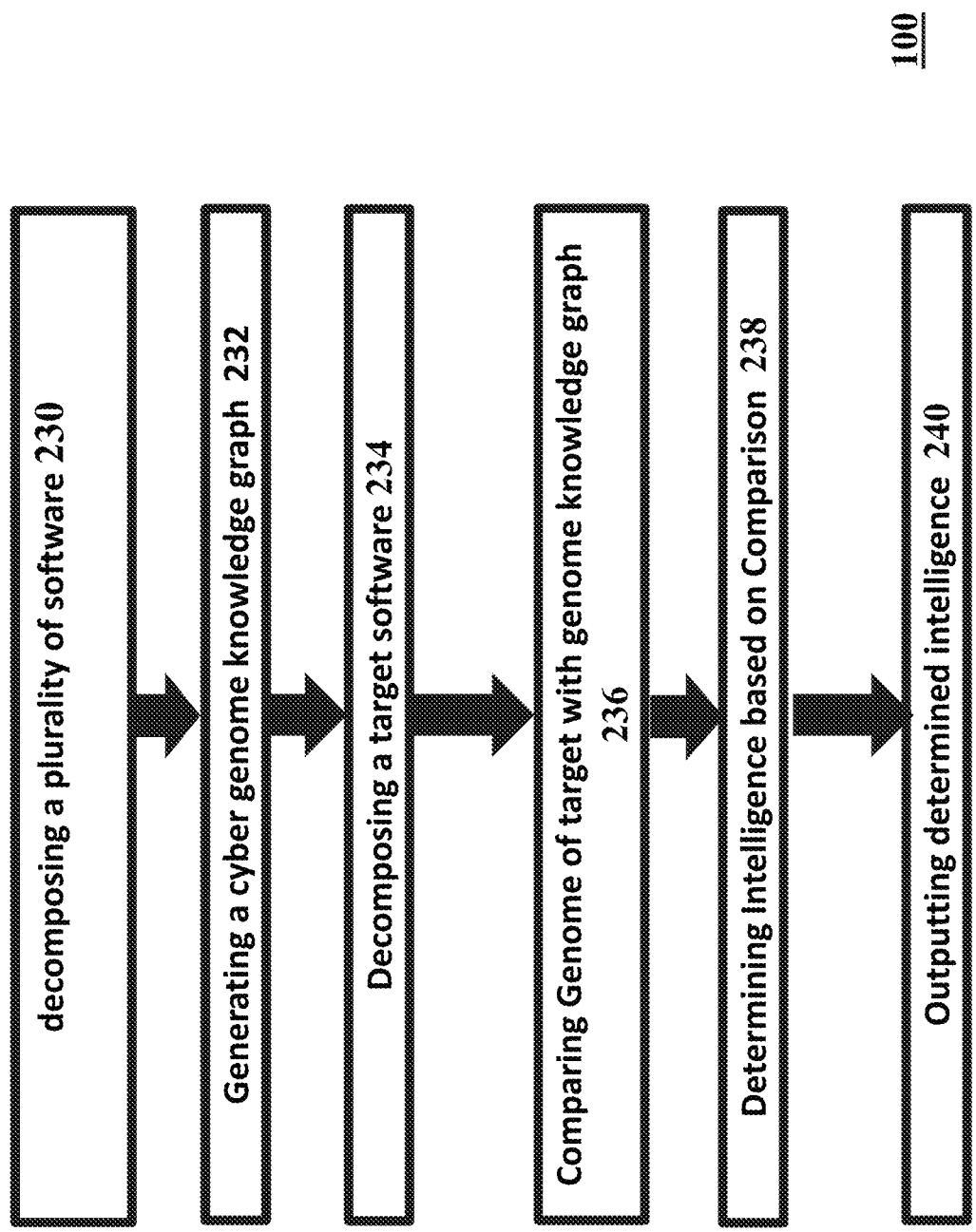
FIG. 3 illustrates a method of software intelligence as-a-service in yet another example embodiment of the present invention.

FIG. 3 illustrates a method of software intelligence as-a-service in another example embodiment of the present invention.

The system 100 decomposes a plurality of software, by performing, for example, an X-ray of a plurality of software programs in order to obtain nuggets or pieces of each of software, piece by piece of that software, from the software function level in step 230. From the plurality of software programs from either source code or the compiled code, the system 100 can decompose the plurality of software into multiple functions, and then look at each of the functions for finding the gene software at a function level in order to build a knowledge graph from the function in step 232. The knowledge graph includes multiple genes or nodes that are connected by a link. The link is similar to physical data relationship between the genes or nodes.

For example, where entities such as a software user or risk assessor downloads a new software (target software), the system 100 calls the new downloaded software to a knowledge graph and while getting the software as queried program or target program, the system decomposes it into functions in step 234, and then into multiple genes. The system 100 then compares the decomposed target software to the software genome knowledge graph in step 236. The system 100 then finds development or relationships from knowledge graph when determining intelligence based on the comparison 238. For example, if it happens that a gene or node is close to a node in software genome knowledge graph (KG) that is considered a bug in knowledge graph, then the target software may be known as a software bug. Then the system 100 can inform people or the entities about software intelligence like the software bug that is discovered, two-way plagiarism, or other risks by outputting the determined intelligence 240.

The X-ray method can be used to get the genome in the decomposing steps 230 and 234. The system 100 is looking to software and software components at a different level than from current methods. One of the many features of the invention is extraction of the gene (or function) from software component (230 and 234) and then form the knowledge graph from the gene (232). Then, the knowledge graph 232 is used for different use cases for different types of users.

Figure 4:
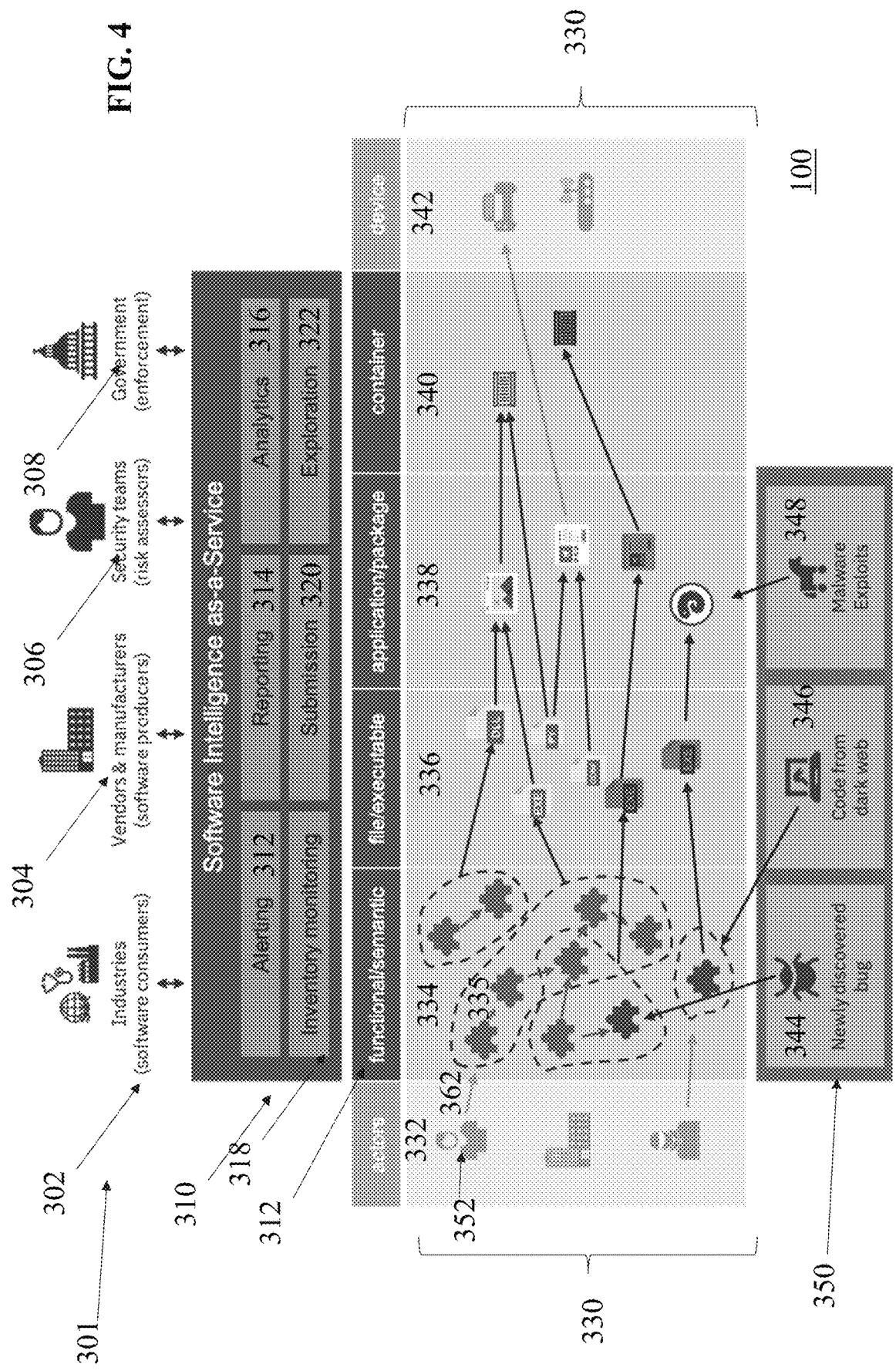
FIG. 4 illustrates a system for software intelligence as a service in an example embodiment of the present invention.

FIG. 4 illustrates a system for software intelligence as-a-service in an example embodiment of the present invention. The system 100 includes a plurality of users, personas or organizations 301, such as software consumers in the industries group 302, software producers in the vendors and manufactures group 304, risk assessors in the security teams group 306, and enforcement in the government group 308. Other users or organizations can be included. The use case or services are the following software intelligence as-a-service 310 including the alerting 312, reporting 314, analytics 316, inventory monitoring 318, submission 320, and exploration 322. These can all be embodied as software modules. Other types of software intelligence as-a-service 310 can also be included. The users or personas 301 can communicate both ways with the software intelligence as-a-service 310 that generates and uses the software genome knowledge graph 330 to determine intelligence on the software 350 that is reported to the users/persona 301.

Referring to FIG. 4, the software genome knowledge graphs 330 include links (further detailed in FIG. 5) between the actors 332, functional/semantic data 334, file or executable files 336, software applications or packages 338, container 340, and device 342 such as printers, wireless network routers, etc. The links show the relationship between the nodes. For example, link 362 shows the relationship between the actor 332 of a user 352 with the set of similar functions 352. With the use of the software genome knowledge graph 330, intelligence 350 can be obtained. For example, newly discovered bugs can be obtained 344, or code from the dark web 346, or malware exploits 348. The "gene" type nodes ae shown in the functional/semantic level 334 such as genes 335. The actors 332, file or executable files 336, software applications or packages 338, container 340, and device 342 are other type of nodes are linked with the "gene" type node in the functional/semantic level 334. Meanwhile, newly discovered bugs 344, or code from the dark web 346, or malware exploits 348 are file-reputation type nodes coming from external sources. Therefore, there are different types of nodes in KG (e.g., software-version, software-source, file-reputation etc.), a gene in the KG is yet another type of node. There are also various links (edges) in the KG that captures various types of relationships among the nodes as shown.

The system 100 uses a method such as software X-ray method decomposing software into its fingerprint of functional building blocks such as functional/semantic blocks 334. The system 100 then performs representation of the decomposition in a software genome knowledge graph 330 linking granularities of the actors 332, functional/semantic data 334, file or executable files 336, software applications or packages 338, container 340, and device 342.

The system 100 provides the software intelligence as-a-service 310 including the alerting 312, reporting 314, analytics 316, inventory monitoring 318, submission 320, and exploration 322 to the users or organizations 300. The system 100 then deduces the intelligence 350 of newly discovered bugs can be obtained 344, or code from the dark web 346, or malware exploits 348 based on the software genome knowledge graph 330.

The use cases are detailed as follows. The users or personas 300 such as software developer 302 can scan software for known vulnerabilities, monitor software inventories for newly discovered vulnerabilities and suspicious code, locate vulnerable software/versions, and detect software plagiarism (e.g., from dark web). Some of the capabilities of the system 100 include discovering and maintaining undeclared/undocumented embedded libraries, and track vulnerabilities across different versions of software.

Device vendors or software producers 304 can scan known vulnerabilities across numerous branches of different products, get informed of newly reported vulnerabilities affecting products, locate vulnerable devices/products, discover and maintain shared vulnerable code snippets across different products, track vulnerabilities across different products, and discover the origin of vulnerabilities from an analysis of the software genome knowledge graph 330.

Threat hunters or risk assessors 306 with the system 100 can detect new variants of malware and exploits (e.g., polymorphism), reidentify suspicious code snippets (e.g., from dark web), assist code instrumentation, save time/resources by identifying new code, provide more comprehensive intelligence beyond antivirus scanning results, and infer software lineage/relationships, e.g., malware evolution, and infer software provenance/attribution.

Another persona or group or user 300 can include cloud providers, which can obtain the intelligence 350 of monitor docker images for vulnerabilities, inspect and predict container risks, locate vulnerable containers, and identify vulnerabilities of custom-built software not maintained by version control.

These persona or users can monetize the system 100 via in a one-time scanning service inspects submissions, or subscription service that continuously monitors inventories. These are merely examples and are not limiting.

Figure 5:
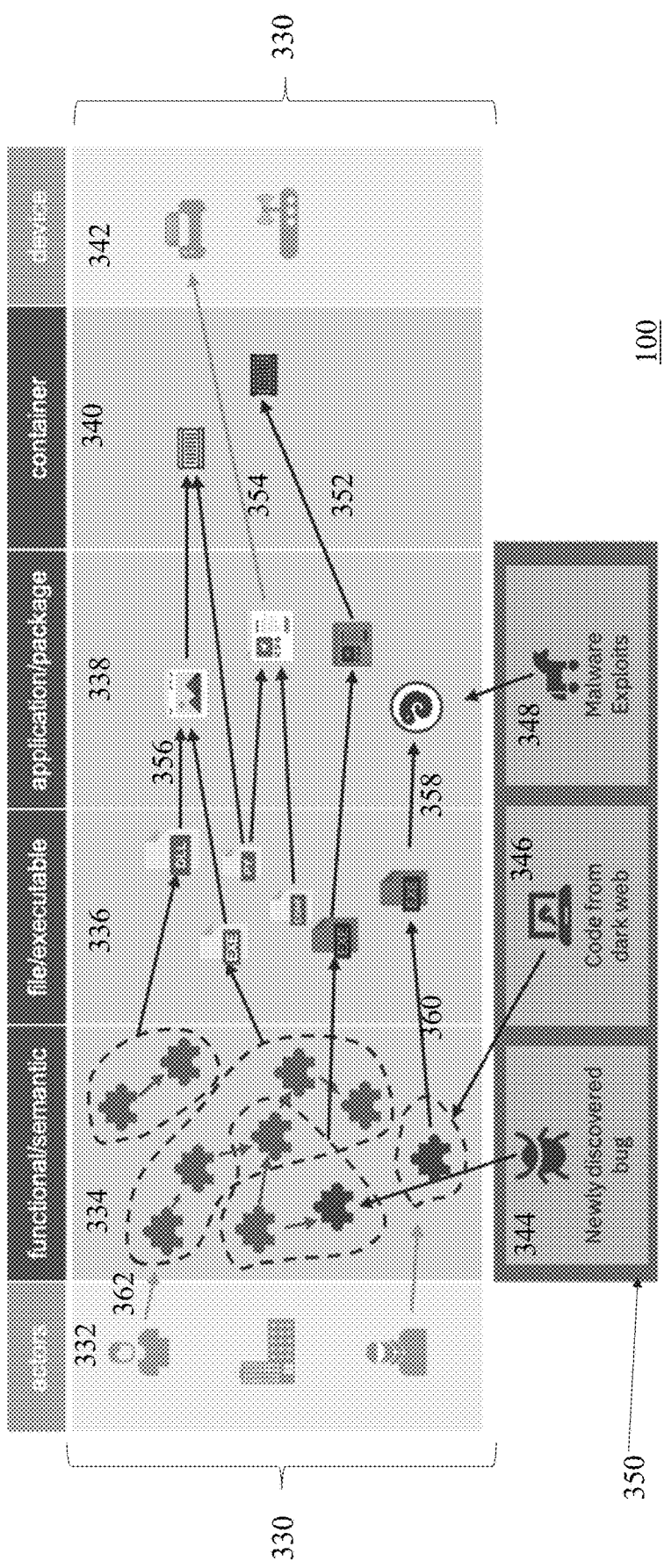
FIG. 5 illustrates further details of the software genome knowledge graph.

FIG. 5 illustrates further details of the software genome knowledge graph 330. The nodes of the knowledge graph 330 are linked accordingly. The software genome knowledge graphs 330 include links between the actors 332, such as an individual user 332 and the functional/semantic data 334 via a link 362 between these nodes.

The software genome knowledge graph 330 provides a link 360 with a function 334 and executable file 336 which shows code from a dark web 346. The node from the executable file 336 is linked with a software package 338 via a link 358 to show the malware exploits 348. Another software package 338 is linked via 352 to a container 342. Another software package 338 is linked via 354 to a peripheral device 342.

Figure 6:
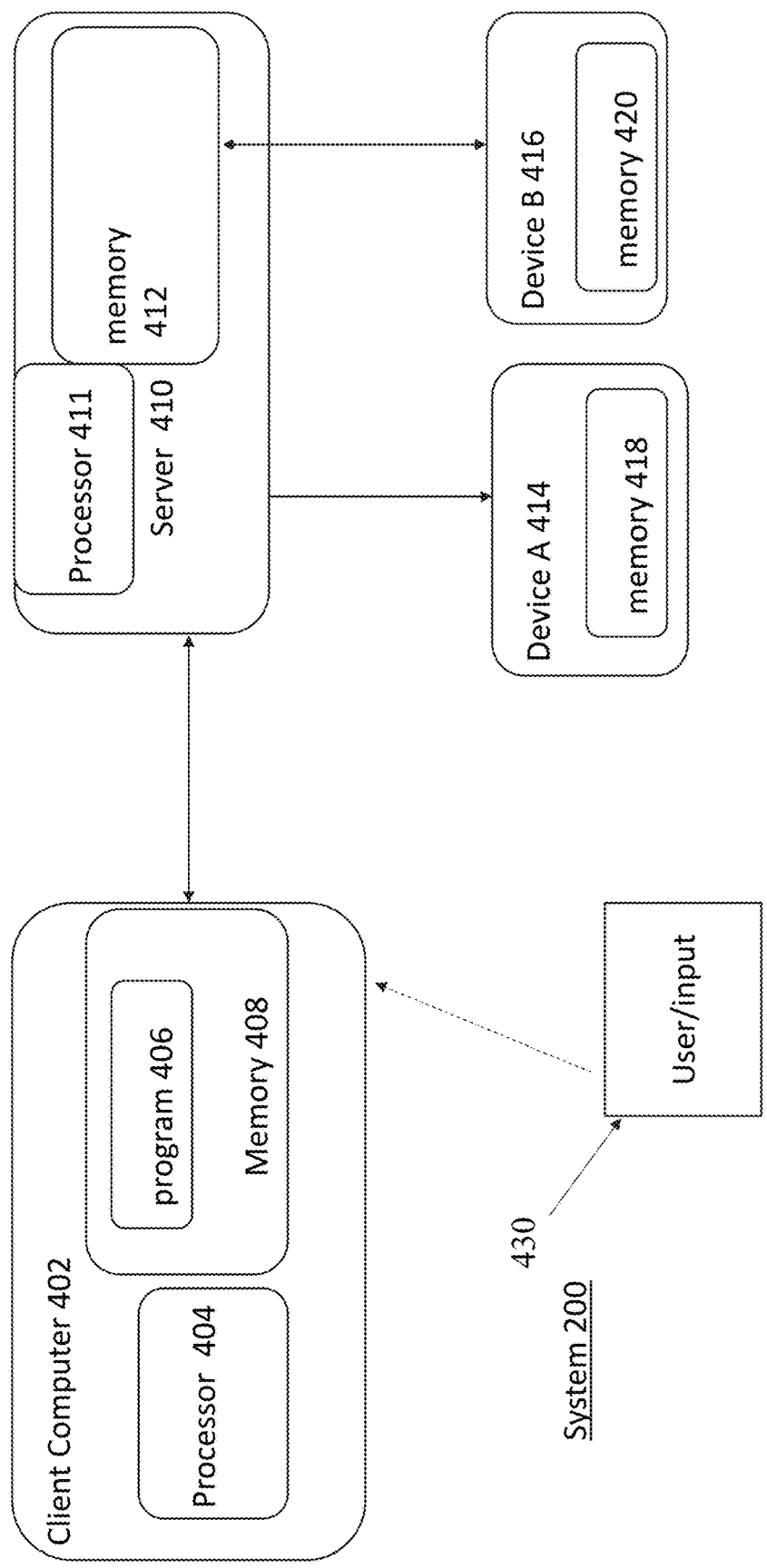
FIG. 6 illustrates a system of an example embodiment for a system for software intelligence as a service.

FIG. 6 illustrates a system 200 of an example embodiment for a system for software intelligence as-a-service, which can implement the examples depicted in FIGS. 1 through 5.

First, there is a receiving and processing source code or the software binary (compiled code objects) from a server 410 stored in the memory 412 or from the program 406 stored in the memory 408 of the client computer 402. As mentioned previously, since software is usually distributed without source code, it is critical to note that the present method can be applied directly to software binary (compiled code objects) without source code.

Then, the processor 404 is extracting or decomposing the source code or the software binary (compiled code objects) of the software stored in memory 408 or 412 into its fingerprint of functional building blocks to generate the software genome. Then, the processor 404 in the client computer 402 representation of the decomposition in a knowledge graph. The processor 404 then process the knowledge graph stored in memory 408 or 412 to deduce intelligence information about the software. The processor 411 on the server 410 can also decompose the software, generate the software knowledge graph, and then determine the intelligence based on the knowledge graph instead of the processor 404 or in parallel with the processor 404. The server 410 can provide the results of the intelligence determination to the client computer 402 or the device A 414 with memory 418 or device B 416 with memory 420. The user such a software consumer or risk assessor can input at 430 information to control the client computer 402 or the server 410 to process the intelligence information. The devices 414 and 416 can be IoT (Internet of Things) devices.

Figure 7:
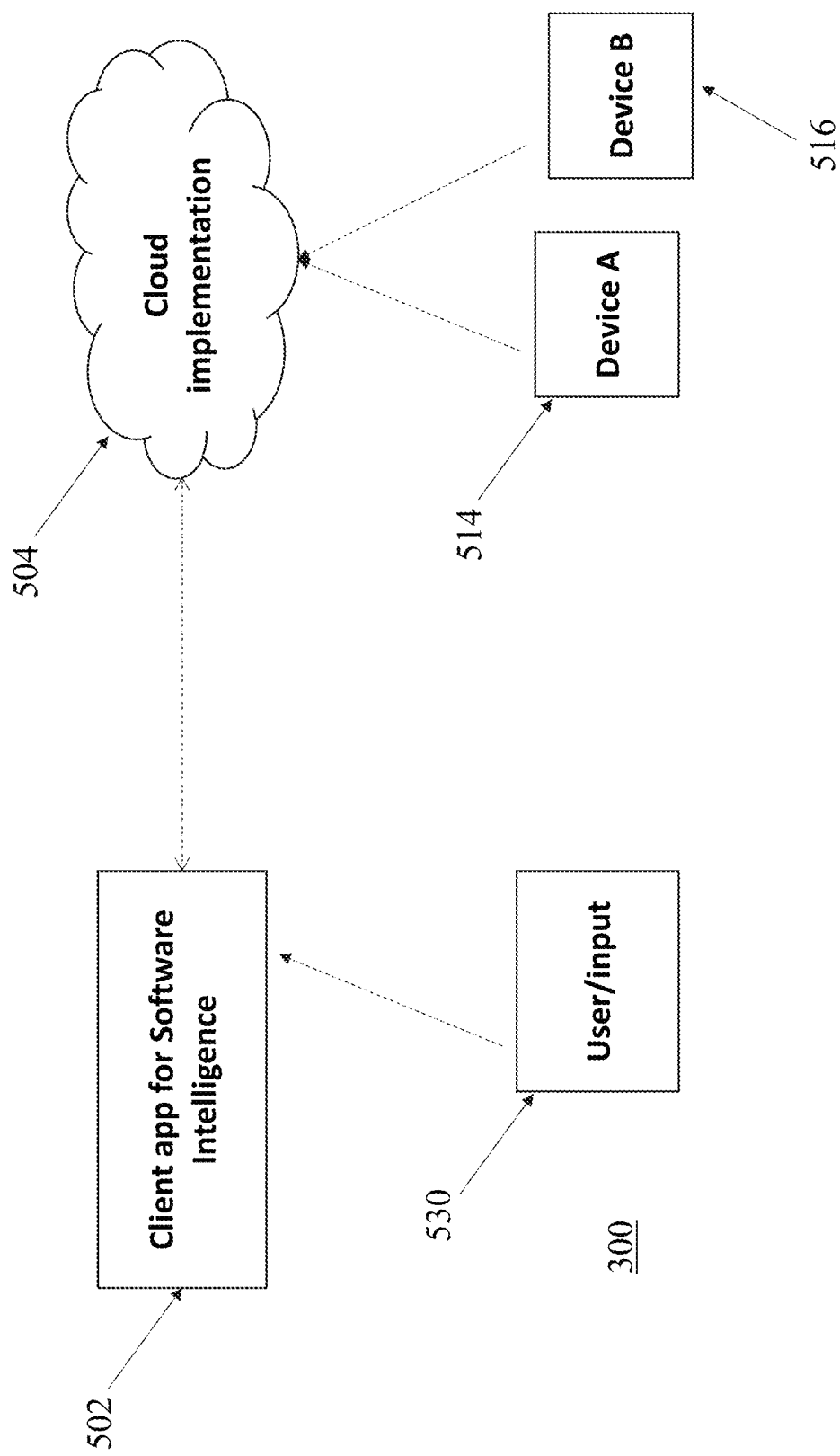
FIG. 7 illustrates a system of an example embodiment for a system for software intelligence as a service in a cloud-based implementation.

FIG. 7 illustrates a system 300 of an example embodiment for a system for software intelligence as a service in a cloud-based implementation, which can implement the examples depicted in FIGS. 1 through 5.

Referring to FIG. 7, first, there is a receiving software stored in the Cloud storage implementation 504 by the client app (application) 502 in system 200. Then, there is decomposing of the functional blocks from the source code or software binary (compiled code objects) of the software or a plurality of software by the client app 202. The decomposing of the software can also be performed in the cloud 504 with instructions from a user 530 to the client app 502. Then, the software genome knowledge graph is generated from the decomposed functional blocks in the cloud 504 or at the local client app 502. Then intelligence is determined from the software genome knowledge graph in the cloud or at the local level of the client app 502. Device A 514 and device B 516 can also provide external data to the cloud 504 and client app 502 to further expand the links to software genome knowledge graph. The cloud implantation can shift the processing demand needed to provide the service to the clouds rather than the client app.

Figure 8:
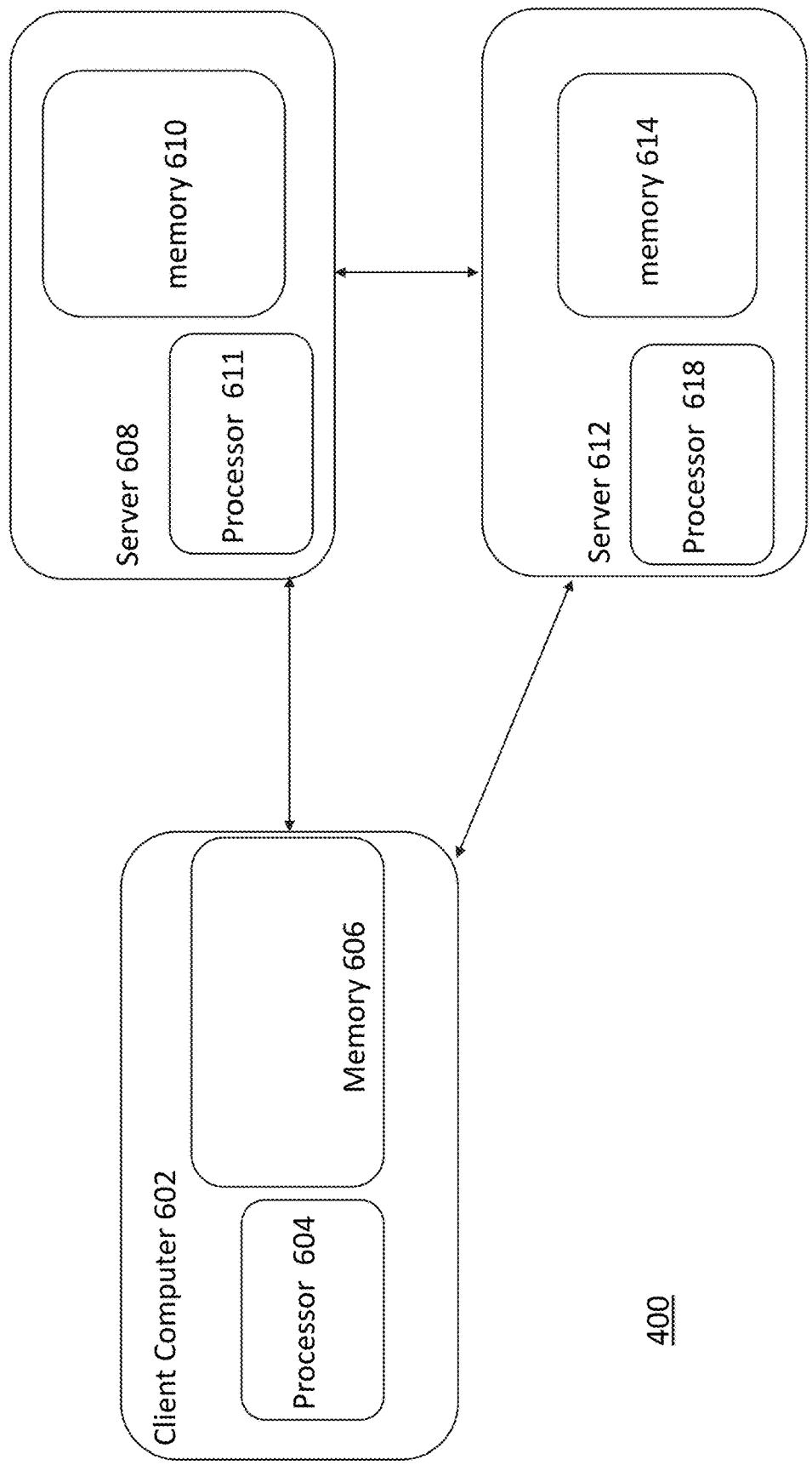
FIG. 8 illustrates another example implementation for software intelligence as-a-service.

FIG. 8 illustrates another example implementation for software intelligence as-a-service system 400, which can implement the examples depicted in FIGS. 1 through 5. In this example, the system 300 has where the processing of the software can be divided into a plurality of servers such as servers 608 and 612. Therefore, the client computer 602 with processor 604 and a program in memory 606 can request the servers 608 and 612 to provide the software intelligence as-a-service. These servers can also be cloud implemented. The client computer 602 can request the processor 611 in server 608 and/or processor 618 in server 612 to execute software x-ray method decomposing software into its fingerprint of functional building blocks of target software. The processors 611 and 618 can then generate the software genome knowledge graphs of the target software stored in memory 610, 614 and/or memory 606. The processors 611 and 618 can then determine intelligence on the target software and provide the intelligence determination of the target software as submission/subscription/reporting/alerting back to the client computer 602 and/or share the information between the servers 608 and 612.

Figure 9:
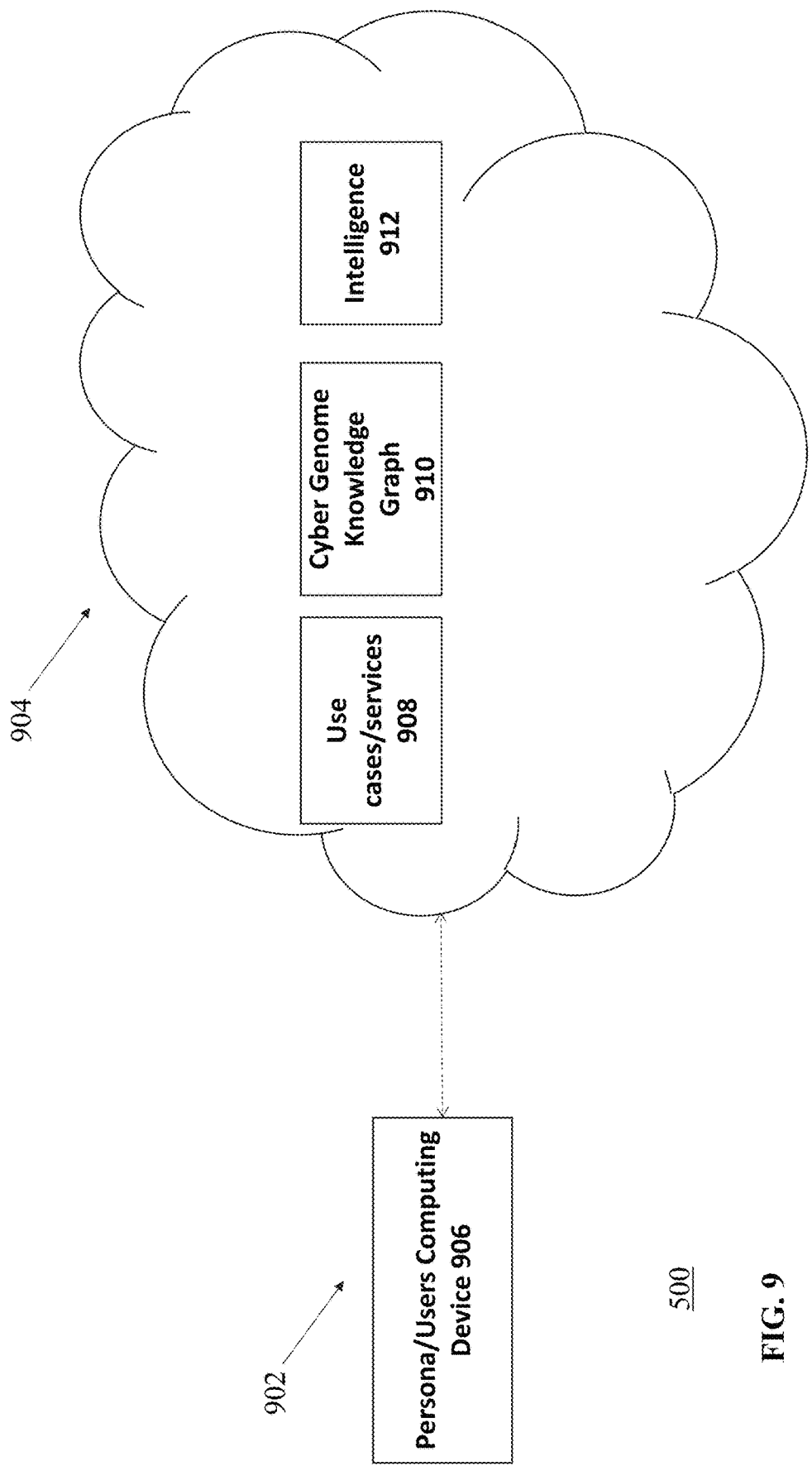
FIG. 9 illustrates yet another example implementation for software intelligence as-a-service in cloud-based implementation.

FIG. 9 illustrates yet another example implementation for software intelligence as-a-service in cloud-based implementation system 500, which can implement the examples depicted in FIGS. 1 through 5.

The system 500 includes persona/user computing device that queries the cloud computing device 904 to decompose software into functional level genomes and then to generate the knowledge graph 910 stored in the cloud computing device 904. Then, the cloud computing device 904 determines intelligence on a target software queried by the persona/user computing device 906 to generate intelligence information 912 on the target software based on the software genome knowledge graph 910. The cloud computing device then outputs the intelligence information 912 back to the persona/user computing device 906 according to the use cases/services module 908.

Therefore, referring to FIGS. 1 through 9, the systems 100, 200, 300, 400, and 500 provide different implementations of the example methods shown above 3. The following FIGS. 10 through 14 provide additional hardware configurations of the software intelligence as-a-service of the present invention. Different features shown in different figures from FIGS. 1 through 14 can be combined, changed or switched between the different examples.

Therefore, the present invention can empower organizations with an unprecedented software-level intelligence service enabling them to stay on top of business risks induced by software (employed and/or produced). The service enables organizations to monitor software at multiple granularities (ranging from binaries, scripts, libraries applications to container images, IoT devices) to solve the following business challenges. All organizations get alerted of risks related of employed software and IoT (Internet of Things) (e.g., vulnerabilities, unwanted code). Developers and vendors can get alerted of risks related to their products (e.g., vulnerabilities, plagiarism [2-way]). Security teams can identify and hunt for new malware variants and suspicious code (e.g., dark web). Government and law enforcement can discover and trace threat actors and groups (e.g., provenance, attribution). Example use cases can include, e.g., does OpenSSL 1.0.2q (software library for applications that secure communications over computer networks) has a critical vulnerability, which applications, containers, or devices are affected, and does any of the container I use contain unwanted code, etc.

Figure 10:
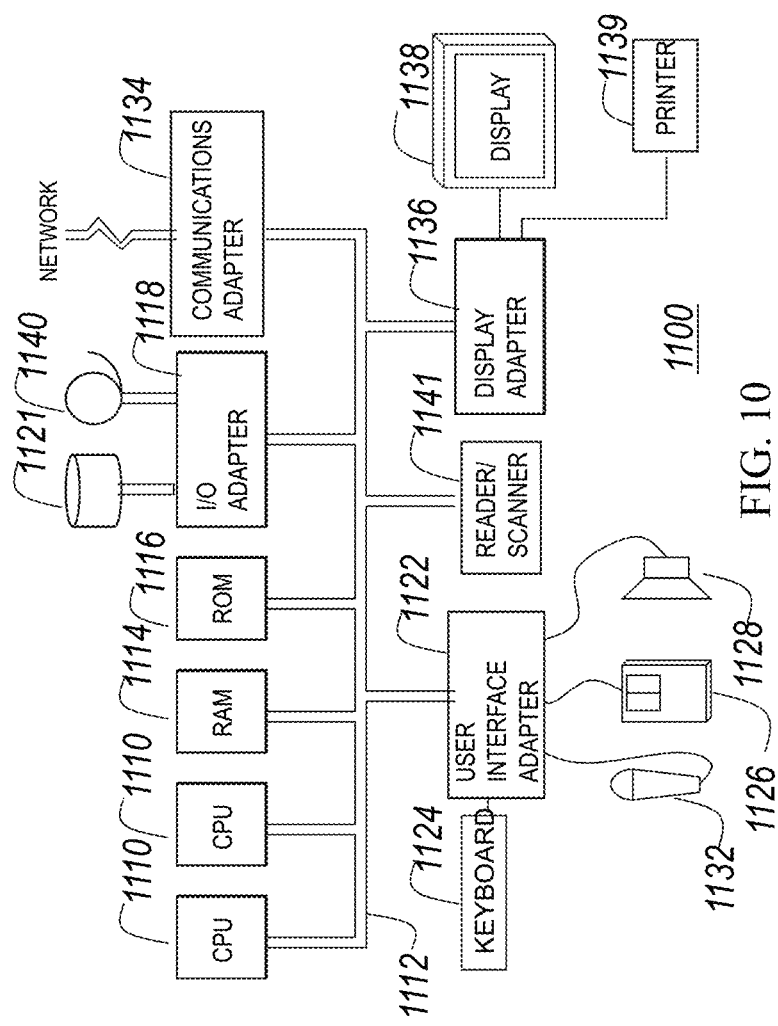
FIG. 10 illustrates an exemplary hardware/information handling system for incorporating the example embodiment of the present invention therein.

FIG. 10 illustrates another hardware configuration of the system 100, where there is an information handling/computer system 1100 in accordance with the present invention and which preferably has at least one processor or central processing unit (CPU) 1110 that can implement the techniques of the invention in a form of a software program for software intelligence as-a-service.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media 1200, such as a magnetic data storage diskette 1210 or optical storage diskette 1220 (FIG. 11), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
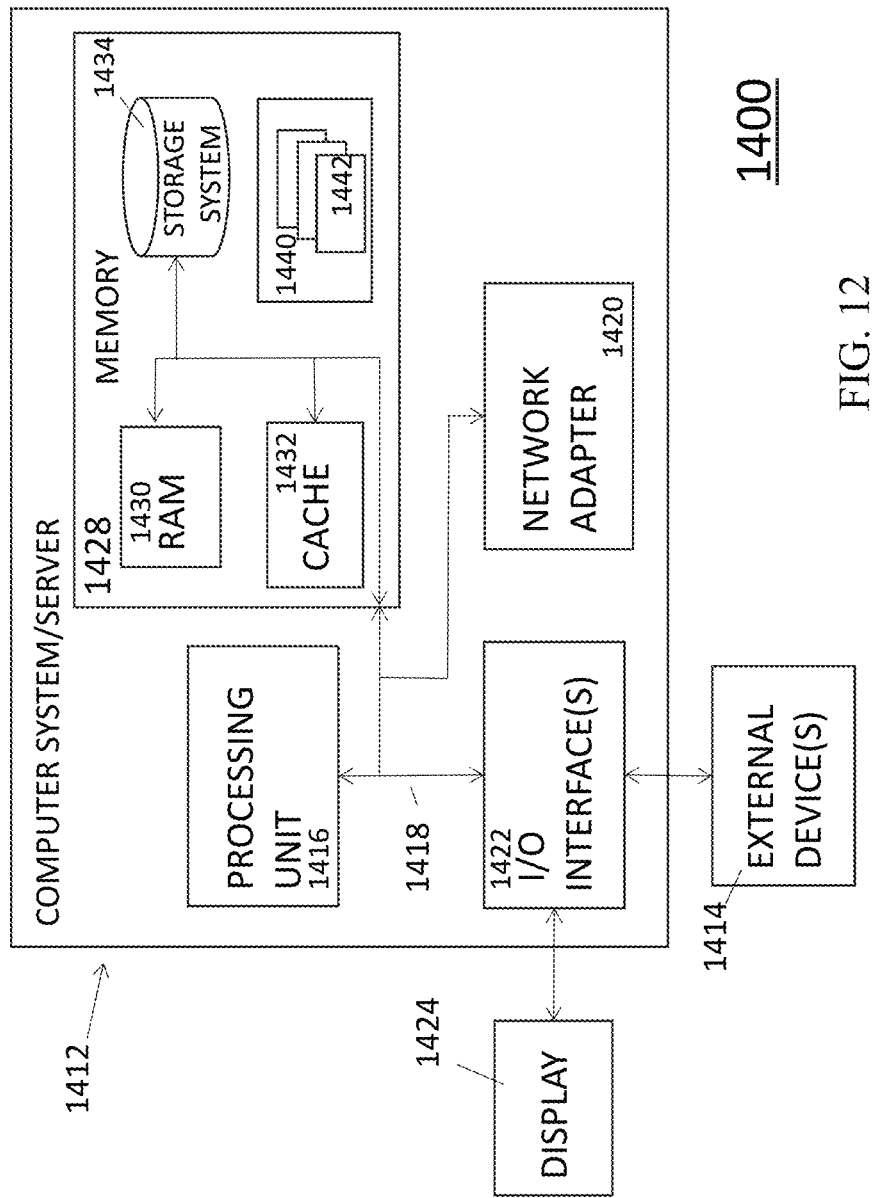
FIG. 12 depicts a cloud computing node according to an example embodiment of the present invention.

Referring now to FIG. 12, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 13:
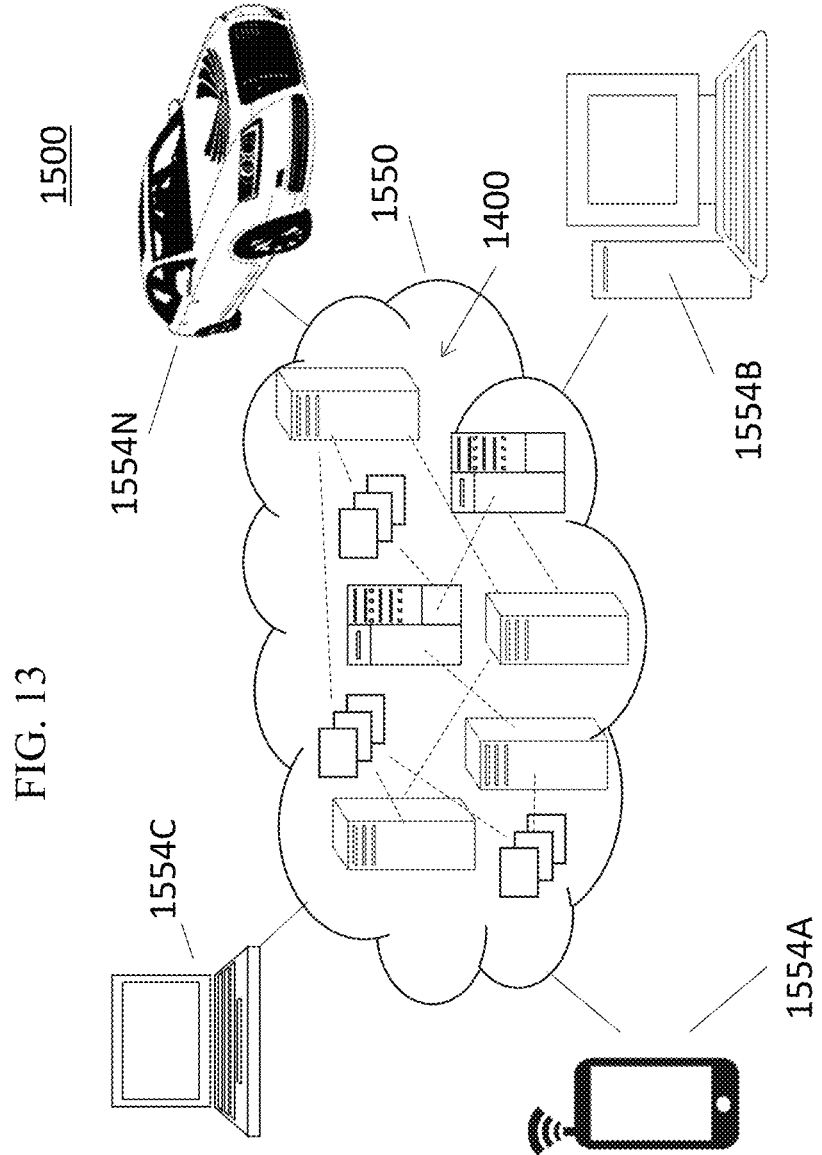
FIG. 13 depicts a cloud computing environment according to an example embodiment of the present invention.

Referring now to FIG. 13, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 13 are intended to be illustrative only and that computing nodes 1400 and cloud computing environment 1550 can communicate with any type of computerized device over any type of network and/or network addressable connection (e.g., using a web browser).

Figure 14:
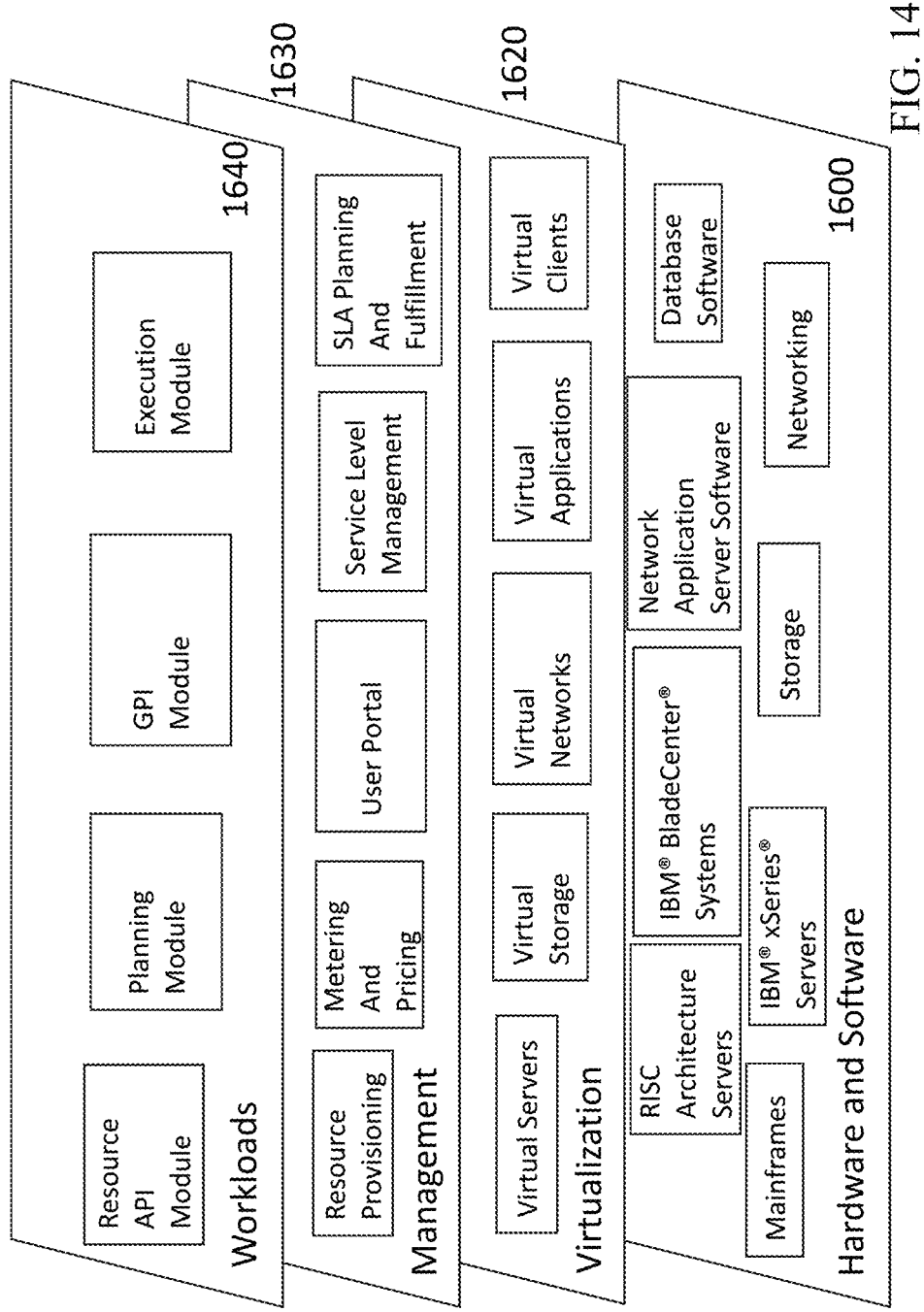
FIG. 14 depicts abstraction model layers according to an example embodiment of the present invention.

Referring now to FIG. 14, a set of functional abstraction layers provided by cloud computing environment 1550 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM p Series® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method for providing software intelligence as-a-service, comprising:
    decomposing a software into functional building blocks to provide a software genome of the software;
    building a representation of the software genome of the software in a knowledge graph includes linking granularities of the functional building blocks;
    decomposing a target software into functional building blocks to provide a software genome of the target software;
    executing machine learning to compare the software genome of the target software with the knowledge graph to identify intelligence issues with the target software;
    producing software intelligence as-a-service by leveraging external and internal threat intelligence to deduce risks related to the target software from a result of the comparison; and
    providing, via a network to a computing device, the software intelligence as-a-service to an organization.

2. The method according to claim 1, further comprising:
    outputting, via the network to the computing device, results of the identifying of the intelligence issues with the target software in the software intelligence as-a-service.

3. The method according to claim 1, wherein the decomposing of the software uses an X-ray method of decomposing on a functional level of the software to provide genes or nodes of the functional building blocks, and
    wherein the building of the representation of the software genome of the software in the knowledge graph includes linking the granularities of the functional building blocks including the genes or the nodes of the functional building blocks.

4. The method according to claim 1, wherein the identifying of the intelligence issues with the target software includes identifying security issues or intellectual property issues of the target software to the organization,
wherein the decomposing of the software uses an X-ray method of decomposing on a functional level of the software to provide genes or nodes of the functional building blocks, and
wherein the building of the representation of the software genome of the software in the knowledge graph includes linking the granularities of the functional building blocks including the genes or the nodes of the functional building blocks.

5. The method according to claim 1, wherein the identifying of the intelligence issues with the target software includes identifying a threat, a problem, or code plagiarism of the target software, and
wherein the knowledge graph is supplemented by a plurality of threat intelligence sources.

6. The method according to claim 1,
wherein the identifying of the intelligence issues with the target software uses a set of external resources threat intelligence and a set of internal resources threat intelligence to detect risks related to the target software.

7. The method according to claim 1, wherein the method is executed by a cloud computing node.

8. A system for providing software intelligence as-a-service, comprising:
a computer, comprising:
a memory storing computer instructions; and
a processor configured to execute the computer instructions to:
decompose a software into functional building blocks to provide a software genome of the software;
build a representation of the software genome of the software in a knowledge graph includes linking granularities of the functional building blocks;
decompose a target software into functional building blocks to provide a software genome of the target software;
execute machine learning to compare the software genome of the target software with the knowledge graph to identify intelligence issues with the target software;
produce software intelligence as-a-service by leveraging external and internal threat intelligence to deduce risks related to the target software from a result of the comparison; and
provide, via a network to a computing device, the software intelligence as-a-service to an organization, wherein the system is cloud-implemented including a cloud computing node.

9. The system according to claim 8, wherein the processor is further configured to execute the computer instructions to:
output, via the network to the computing device, results of the identifying of the intelligence issues with the target software in the software intelligence as-a-service.

10. The system according to claim 8, wherein the decomposing of the software uses an X-ray method of decomposing on a functional level of the software to provide genes or nodes of the functional building blocks,
wherein the building of the representation of the software genome of the software in the knowledge graph includes linking the granularities of the functional building blocks including the genes or the nodes of the functional building blocks, and
wherein the identifying of the intelligence issues with the target software includes identifying security issues or intellectual property issues of the target software to the organization.

11. The system according to claim 8, wherein the identifying of the intelligence issues with the target software includes identifying a threat, a problem, or code plagiarism of the target software, and
wherein the knowledge graph is supplemented by a plurality of threat intelligence sources.

12. The system according to claim 8,
wherein the identifying of the intelligence issues with the target software uses a set of external resources threat intelligence and a set of internal resources threat intelligence to detect risks related to the target software.

13. A computer program product comprising a computer readable storage medium having program instructions embodied therewith, the program instructions readable and executable by a computer to cause the computer to perform a method for providing software intelligence as-a-service, comprising:
decomposing a software into functional building blocks to provide a software genome of the software;
building a representation of the software genome of the software in a knowledge graph includes linking granularities of the functional building blocks;
decomposing a target software into functional building blocks to provide a software genome of the target software;
executing machine learning to compare the software genome of the target software with the knowledge graph to identify intelligence issues with the target software;
producing software intelligence as-a-service by leveraging external and internal threat intelligence to deduce risks related to the target software from a result of the comparison; and
providing, via a network to a computing device, the software intelligence as-a-service to an organization, wherein the computer program product is stored in a cloud storage and executed by a cloud computing node.

14. The computer program product according to claim 13, further comprising:
outputting, via the network to the computing device, results of the identifying of the intelligence issues with the target software in the software intelligence as-a-service.

15. The computer program product according to claim 13, wherein the decomposing of the software uses an X-ray method of decomposing on a functional level of the software to provide genes or nodes of the functional building blocks,
wherein the building of the representation of the software genome of the software in the knowledge graph includes linking the granularities of the functional building blocks including the genes or the nodes of the functional building blocks, and
wherein the identifying of the intelligence issues with the target software includes identifying security issues or intellectual property issues of the target software to the organization.

16. The computer program product according to claim 13, wherein the identifying of the intelligence issues with the target software includes identifying a threat, a problem, or code plagiarism of the target software, and wherein the knowledge graph is supplemented by a plurality of threat intelligence sources.

* * * * *